(12) United States Patent
Cloupet et al.

(10) Patent No.: US 11,839,872 B2
(45) Date of Patent: Dec. 12, 2023

(54) CONVERSION OF A CRUDE OIL IN A FLUIDIZED BED COMPRISING ZONES WITH DIFFERENT CONTACT TIMES

(71) Applicant: IFP Energies Nouvelles, Rueil-Malmaison (FR)

(72) Inventors: Ann Cloupet, Rueil-Malmaison (FR); Ludovic Raynal, Rueil-Malmaison (FR)

(73) Assignee: IFP Energies Nouvelles, Rueil-Malmaison (FR)

(*) Notice: Subject to any disclaimer, the term of this patent is extended or adjusted under 35 U.S.C. 154(b) by 0 days.

(21) Appl. No.: 17/415,920

(22) PCT Filed: Dec. 13, 2019

(86) PCT No.: PCT/EP2019/085014
§ 371 (c)(1),
(2) Date: Jun. 18, 2021

(87) PCT Pub. No.: WO2020/126873
PCT Pub. Date: Jun. 25, 2020

(65) Prior Publication Data
US 2022/0062845 A1      Mar. 3, 2022

(30) Foreign Application Priority Data
Dec. 19, 2018   (FR) ..................... 1873442

(51) Int. Cl.
*B01J 8/18*      (2006.01)
*B01J 8/28*      (2006.01)
(Continued)

(52) U.S. Cl.
CPC ........... *B01J 8/1863* (2013.01); *B01J 8/1872* (2013.01); *B01J 8/28* (2013.01); *B01J 8/388* (2013.01);
(Continued)

(58) Field of Classification Search
CPC ..... B01J 8/00; B01J 8/18; B01J 8/1845; B01J 8/1863; B01J 8/1872; B01J 8/24;
(Continued)

(56) References Cited

U.S. PATENT DOCUMENTS 2,919,241 A   12/1959   Kelly et al.
3,186,805 A   6/1965   Gomory
(Continued)

FOREIGN PATENT DOCUMENTS

FR   2298595 A1   8/1976
WO   18108751 A1   6/2018

OTHER PUBLICATIONS

International Search Report PCT/EP2019/085014 dated Feb. 10, 2020 (pp. 1-3).

*Primary Examiner* — Natasha E Young
(74) *Attorney, Agent, or Firm* — MILLEN WHITE ZELANO AND BRANIGAN, PC; Csaba Henter (57) ABSTRACT

The present invention relates to a device and to a process for the fluidized bed catalytic cracking of a hydrocarbon feedstock, in which: a first feedstock (2) is cracked in a dense fluidized bed reactor (1) in the presence of a catalyst (3) to produce a first effluent; and at least one second feedstock (10) is cracked in a transport fluidized bed reactor (4) in the presence of the catalyst (3) supplied by the dense fluidized bed reactor (1) to produce a second effluent, the second feedstock (10) being a heavier feedstock than the first feedstock (2).

15 Claims, 6 Drawing Sheets

(51) Int. Cl.
*B01J 8/38* (2006.01)
*C10G 11/16* (2006.01)
*C10G 11/18* (2006.01)

(52) U.S. Cl.
CPC .............. *C10G 11/16* (2013.01); *C10G 11/18* (2013.01); *B01J 2208/0084* (2013.01); *B01J 2208/00557* (2013.01); *B01J 2208/00938* (2013.01); *C10G 2300/104* (2013.01); *C10G 2300/1059* (2013.01); *C10G 2300/4006* (2013.01); *C10G 2300/4012* (2013.01); *C10G 2300/4018* (2013.01); *C10G 2300/4025* (2013.01); *C10G 2300/70* (2013.01); *C10G 2400/20* (2013.01)

(58) Field of Classification Search
CPC ......... B01J 8/26; B01J 8/28; B01J 8/38; B01J 8/384; B01J 8/388; B01J 2208/00; B01J 2208/00008; B01J 2208/00548; B01J 2208/00557; B01J 2208/00796; B01J 2208/00823; B01J 2208/00831; B01J 2208/0084; B01J 2208/00938; C10G 11/00; C10G 11/14; C10G 11/16; C10G 11/18; C10G 2300/00; C10G 2300/10; C10G 2300/1037; C10G 2300/104; C10G 2300/1048; C10G 2300/1059; C10G 2300/40; C10G 2300/4006; C10G 2300/4012; C10G 2300/4018; C10G 2300/4025; C10G 2300/70; C10G 2400/00; C10G 2400/20

See application file for complete search history.

(56) References Cited

U.S. PATENT DOCUMENTS

| | | | |
|---|---|---|---|
| 3,639,228 A | 2/1972 | Carr et al. | |
| 3,671,420 A * | 6/1972 | Wilson | C10G 47/00 208/164 |
| 4,717,466 A * | 1/1988 | Herbst | C10G 11/18 208/113 |
| 4,957,617 A * | 9/1990 | Owen | B01J 8/1836 208/120.15 |
| 5,087,349 A | 2/1992 | Goelzer et al. | |
| 9,290,705 B2 | 3/2016 | Bourane et al. | |
| 2011/0176968 A1* | 7/2011 | Fan | C01B 3/344 422/139 |
| 2014/0357912 A1 | 12/2014 | Mandal et al. | |
| 2018/0079973 A1 | 3/2018 | Chen et al. | |
| 2019/0314781 A1 | 10/2019 | Cloupet et al. | |

* cited by examiner

CONVERSION OF A CRUDE OIL IN A FLUIDIZED BED COMPRISING ZONES WITH DIFFERENT CONTACT TIMES

This application is a national stage application claiming priority to PCT/EP2019/085014, now WO2020/126873, filed on Dec. 13, 2019, which claims priority to French Patent Application Serial No. FR1873442, filed on Dec. 18, 2018.

TECHNICAL FIELD

The invention relates to the field of refining and petrochemistry and to processes and devices for the chemical conversion of petroleum products, in particular of a crude oil, by fluid catalytic cracking (FCC).

PRIOR ART

FCC is a process conventionally used in refining to convert a heavy feedstock, characterized by an initial boiling point close to 340° C., often greater than 380° C., into lighter products which can be used as fuels, in particular into gasoline, primary product of FCC, characterized by initial boiling points close to ambient temperature and by final boiling points of 160° C., indeed even 220° C., according to whether or not light gasoline is concerned. The field of operation of the process has expanded in its feedstocks, with in particular mixtures of heavy products and of lighter products (recycled cuts from other processes), but also in its products with in particular the production of propylene (olefin of the C3 cut) for use in petrochemistry, the other light olefins (C2 ethylene) and butenes (C4 olefins) not generally being upgraded as products to petrochemistry (generally the C2 cut is not recovered and the C4 cut is directed toward conversion into gasoline via processes of alkylation or MTBE, for example). In all of these cases, the FCC feedstock(s) have formed the subject of physical and/or chemical treatments upstream of the process (separations by distillation, pretreatment in a catalytic unit to remove nitrogen, metals, and the like).

In order to render an FCC unit even more flexible, it is advantageous to be able to treat, in one and the same FCC unit, several types of petroleum feedstocks or cuts while widening the boiling point range of these and thus while limiting the number of upstream operations, and while widening the range of advantageous products toward light olefins, such as ethylene, propylene or butenes, or toward aromatics contained in the liquid fractions. Depending on the cut to be treated, an optimum contact time and an optimum reaction temperature must be considered. Patents describe FCC units comprising several points of injection of feedstocks and/or several points of injection of the regenerated catalyst. Other patents describe the employment of several reactors and/or the use of different catalysts.

US 2014/0357912 A1 describes an FCC unit with an upward gas-solid cocurrentwise fluidized bed reactor (riser) separated into three temperature zones into which different hydrocarbon feedstocks are injected, in order to increase the proportion of light olefins. On the other hand, said hydrocarbon feedstocks are recycles of cuts produced by the FCC, and all are injected into the riser; the contact times are different but remain short.

U.S. Pat. No. 3,639,228 describes a staged injection of regenerated catalyst at different elevations in the riser, in order to increase the selectivity for gasoline (feedstock injected at the bottom of the riser).

US 2018/0079973 A1 describes an FCC unit comprising two reactors and a regenerator using two catalysts, a first catalyst of which is finer and less dense than the second catalyst, to improve the production of light olefins.

U.S. Pat. No. 9,290,705 B2 describes an FCC process in which crude oil is separated into a high boiling point fraction and a low boiling point fraction, and each fraction is treated in different downward gas-solid cocurrentwise fluidized beds (downer), the catalyst resulting from the two downers being treated in a common regenerator.

SUMMARY OF THE INVENTION

In the context described above, we have observed that lighter feedstocks crack with more difficulty than heavy feedstocks. We propose to convert the lighter feedstocks with a greater contact time with the catalyst, optionally with a greater amount of catalyst corrected for the amount of feedstock to be converted, and/or, in the case of the use of different catalysts, a more active catalyst to convert the lighter feedstocks.

A first object of the present invention is to provide FCC units making it possible, on the one hand, to treat a hydrocarbon fraction having a large boiling temperature range and, on the other hand, to maximize the production of light olefins with an emphasis on increasing the synergy between refining and petrochemistry by redirecting the processes of refining and their products toward petrochemistry.

According to a first aspect, the abovementioned object, and also other advantages, are obtained by a device for the fluidized bed catalytic cracking of a hydrocarbon feedstock, comprising:

a dense fluidized bed reactor suitable for at least partially cracking a first hydrocarbon feedstock in the presence of a catalyst to produce a first effluent, and at least partially feeding with catalyst a transport fluidized bed reactor; and     the transport fluidized bed reactor suitable for at least partially cracking at least one second hydrocarbon feedstock in the presence of the catalyst to produce a second effluent,     the second hydrocarbon feedstock being a heavier feedstock than the first hydrocarbon feedstock.

According to a second aspect, the abovementioned object, and also other advantages, are obtained by a process for the fluidized bed catalytic cracking of a hydrocarbon feedstock, comprising:

at least partially cracking a first hydrocarbon feedstock in a dense fluidized bed reactor in the presence of a catalyst to produce a first effluent;

feeding with catalyst a transport fluidized bed reactor at least partially from the dense fluidized bed reactor; and     at least partially cracking at least one second hydrocarbon feedstock in the transport fluidized bed reactor in the presence of the catalyst to produce a second effluent;

the second hydrocarbon feedstock being a heavier feedstock than the first hydrocarbon feedstock.

According to one or more embodiments, the dense fluidized bed reactor is directly connected to the transport fluidized bed reactor in order to directly feed the transport fluidized bed reactor with catalyst.

According to one or more embodiments, the dense fluidized bed reactor is an ebullating or turbulent fluidized bed reactor.

According to one or more embodiments, the transport fluidized bed reactor is an upward or downward gas-solid cocurrentwise fluidized bed reactor.

According to one or more embodiments, the transport fluidized bed reactor is an upward gas-solid cocurrentwise fluidized bed reactor.

According to one or more embodiments, the dense fluidized bed reactor is connected to an intermediate feedstock inlet of the transport fluidized bed reactor.

According to one or more embodiments, the dense fluidized bed reactor comprises at least two compartments for treating the first hydrocarbon feedstock in the form of at least one first lighter feedstock and one first less light feedstock, and in which: either a first compartment is fed with a first catalyst and a second compartment fed with a second catalyst; or a first compartment is fed with the catalyst resulting directly from a regenerator and a second compartment is fed with catalyst by movement between the first compartment and the second compartment.

According to one or more embodiments, the operating conditions of the dense fluidized bed reactor are as follows:
  superficial gas velocity: between 0.2 and 2 m/s;
  temperature: between 500 and 800° C. and preferably less than 750° C.;
  pressure: between 0.1 and 0.6 MPaa; and
  contact time of greater than 1 second.

According to one or more embodiments, the operating conditions of the transport fluidized bed reactor are as follows:
  superficial gas velocity: between 3 and 30 m/s;
  temperature: between 500 and 700° C. and preferably less than 650° C.;
  pressure: between 0.1 and 0.6 MPaa;
  contact time of less than 1 second; and
  a ratio by weight of the catalyst to the feedstock C/O: between 3 and 50.

Embodiments of the process and of the device which are referenced above and also other characteristics and advantages will become apparent on reading the description which will follow, given solely by way of illustration and without limitation, and with reference to the following drawings.

DESCRIPTION OF THE EMBODIMENTS

The invention relates to the field of FCC processes and devices for converting, at least in part, a crude oil (e.g., after a first fractionation) in an FCC-type unit, with the aim of optimizing the production of light olefins.

The conversion process and device according to the invention can be defined as a series of cracking steps or reactors/sections intended to convert cuts or all the cuts of a crude oil. On the basis of experimental tests, it turns out that the conversion of light feedstocks (e.g. naphtha) requires a significantly greater contact time than for heavy feedstocks (e.g. VGOs), the latter being conventionally the feedstocks treated in an FCC reactor (e.g. riser). We have found that it is possible to employ an FCC device comprising a zone of high contact time and a zone of lower contact time in order to maximize the production of light olefins, the various cuts being injected into the appropriate contact time zone according to the contact time required for each cut. This involves, for example, injecting a lighter cut into the zone of highest contact time, and a heavier cut into the zone of lowest contact time. This use, which comprises in particular successively treating, in the direction followed by the catalyst (solid particles), first the lighter feedstock in a reactor, the technology of which offers a long contact time (e.g. dense fluidized bed), then the heavier feedstock in a reactor, the technology of which offers a short contact time (e.g. entrained bed), also proves to be relevant because it takes advantage of the fact that the cracking of a light fraction is only slightly coking while the cracking of a heavy cut is very coking. Thus, on leaving the first step after having contributed to the cracking of the lighter fraction, the catalyst is still active because of its low coke content; it remains effective for cracking the heavier fraction, which produces more coke. The catalyst, once coked, no longer plays its catalytic role; the coked catalyst can subsequently be separated from the effluents in order for the latter not to continue to crack under the thermal effect, resulting in an overproduction of dry gas (light gas fraction having a low value).

The present invention can be defined as a device for the catalytic cracking in a fluidized bed of a hydrocarbon feedstock, comprising a dense fluidized bed reactor suitable for cracking a light feedstock in the presence of a catalyst; and a transport fluidized bed reactor connected to the dense fluidized bed reactor and suitable for cracking a heavy feedstock in the presence of the catalyst fed by the dense fluidized bed reactor. Preferably, the transport fluidized bed reactor is directly connected to the dense fluidized bed reactor. For example, an outlet of the dense fluidized bed reactor can emerge directly on an inlet of the transport fluidized bed reactor.

In the present patent application, the term "dense fluidized bed" means a gas-solid fluidized bed operating under ebullating conditions or under turbulent conditions.

According to one or more embodiments, the dense fluidized bed reactor is chosen from an ebullating fluidized bed reactor and a turbulent fluidized bed reactor (e.g., contact time of greater than 1 second, such as several seconds).

In the present patent application, the term "ebullating fluidized bed" means a gas-solid fluidized bed, the gas velocity of which is between the minimum fluidization velocity and the velocity of transition to the turbulent conditions. These velocities depend on the properties of the solid catalyst (density, size, shape of the grains, and the like). The fraction by volume of solid is between a value close to 0.4 and the maximum fraction by volume of solid corresponding to a non-fluidized fixed bed, generally close to 0.5.

In the present patent application, the term "turbulent fluidized bed" means a gas-solid fluidized bed, the gas velocity of which is between the velocity of transition to the turbulent conditions and the transportation velocity. The fraction by volume of solid is between a value close to 0.25 and a value close to 0.4.

In the present patent application, the term "transport fluidized bed" means a gas-solid fluidized bed, the gas velocity of which is greater than the transportation velocity. The fraction by volume of solid is less than a value close to 0.25.

In the present patent application, the term "transportation velocity" corresponds to the velocity with which essentially all the solid is entrained by the gas. The transportation velocity is known to a person skilled in the art. For example, the transportation velocity can be determined as a function of the properties of the gas (e.g. viscosity and density), of the properties of the particles (e.g. size and density) and of the size of the fluidized bed (e.g. diameter and height).

According to one or more embodiments, the transport fluidized bed reactor is chosen from an upward gas-solid cocurrentwise fluidized bed reactor and a downward gas-solid cocurrentwise fluidized bed reactor (e.g. contact time of less than 1 second, such as of the order of ten ms). According to one or more embodiments, the transport fluidized bed reactor is an upward gas-solid cocurrentwise fluidized bed reactor (riser).

Figure 1:
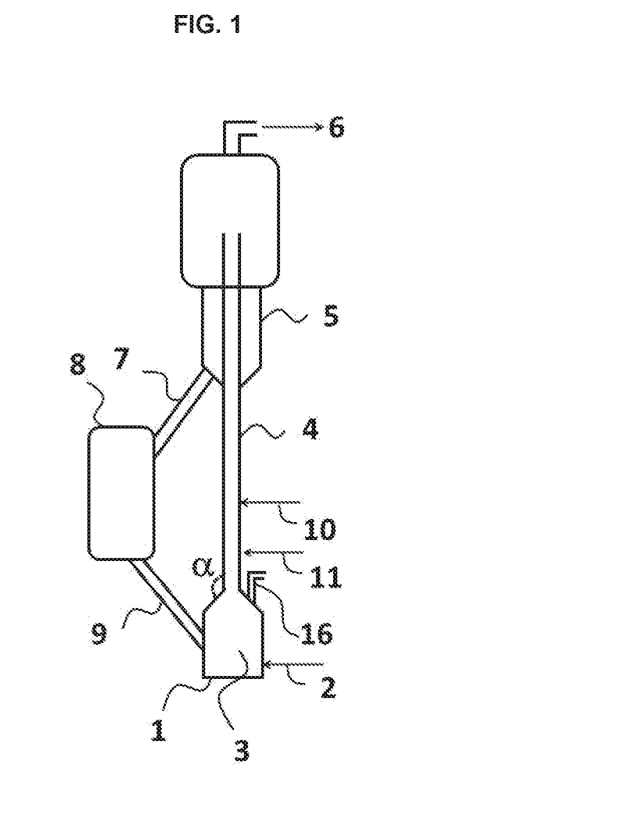
FIG. 1 describes a diagram of an FCC device according to one or more embodiments of the present invention in which the dense fluidized bed reactor is connected to the bottom of a riser.

FIG. 1 describes a diagram of an FCC device according to one or more embodiments of the present invention comprising:
  a dense fluidized bed reactor 1 suitable for: being fed by and at least partially cracking a first feedstock 2, e.g. light cut (of a crude oil); and producing a first effluent (e.g. gaseous) in the presence of a catalyst 3 (e.g. fresh or regenerated);
  a riser 4 connected to an outlet of the dense fluidized bed reactor 1 and suitable for: being at least partially fed, and preferably directly fed, with catalyst (e.g. partially spent catalyst) by the dense fluidized bed reactor 1; being fed by and at least partially cracking at least one second feedstock 10, e.g. heavy cut (of a crude oil), in the presence of the catalyst 3 (partially spent); and producing a second effluent (e.g. gaseous);
  a stripper 5 connected (e.g. directly) to the outlet of the riser 4 and suitable for: being fed by the second effluent as well as a stripping gas (not represented), the stripping gas preferably being devoid of hydrocarbons and preferably comprising steam coming, countercurrentwise to the catalyst; desorbing hydrocarbons adsorbed on said portion of the catalyst; sending the gaseous products, via a first pipe 6, for example to a fractionation column (not represented); and sending, via a second pipe 7, the portion of catalyst which essentially no longer contains adsorbed hydrocarbons or which essentially no longer entrains hydrocarbons in the interstitial space, the latter being occupied by the stripping gas, to a regenerator 8;
  the regenerator 8 suitable for: incinerating the coke formed contained in the pore volume of the catalyst; and sending, via a third pipe 9, the portion of regenerated catalyst to the dense fluidized bed reactor 1.

With reference to FIG. 1, according to one or more embodiments, the dense fluidized bed reactor 1 is suitable for: sending the catalyst to the riser 4; and sending the first effluent to the fractionation column, for example via at least a fourth dedicated pipe 16. For example, the device can comprise a transportation member (not represented) suitable for injecting a gas into the riser 4 and ensuring the transportation of the catalyst. For example, the dense fluidized bed reactor 1 can comprise a gas-solid separation device (not represented) known to a person skilled in the art. According to one or more embodiments, the separation of the gaseous effluents and of the catalyst particles in the dense fluidized bed reactor 1 is improved by one or more stages of cyclones. According to one or more embodiments, the cyclones comprise return legs recycling the catalyst into the fluidized bed. It is understood that a part of the catalyst can be entrained with the first effluent to the fractionation column and that a part of the first effluent can be entrained with the catalyst in the riser 4. According to one or more embodiments, at least 95% by weight, preferably at least 98% by weight, very preferably at least 99% by weight, of the catalyst resulting from the dense fluidized bed reactor 1 is sent to the riser 4, and/or at least 80% by weight, preferably at least 90% by weight, very preferably at least 95% by weight, of the first effluent is sent to the fractionation column.

According to one or more embodiments, the dense fluidized bed reactor 1 is suitable for sending the catalyst and at least a part of the first effluent to the riser 4. According to one or more embodiments, the device comprises a pressure loss member (not represented) arranged between the dense fluidized bed reactor 1 and the fractionation column in order to modify the distribution of the cracked gas to the riser and/or to the fractionation column. According to one or more embodiments, at least 95% by weight, preferably at least 98% by weight, very preferably at least 99% by weight, of the catalyst resulting from the dense fluidized bed reactor 1 is sent to the riser 4, and/or at least 50% by weight, preferably at least 75% by weight, very preferably at least 90% by weight, of the first effluent is sent into the riser 4 with the catalyst resulting from the dense fluidized bed reactor.

According to one or more embodiments, the dense fluidized bed reactor 1 emerges in the riser 4 via a diameter restriction arranged (at the interface) between the dense fluidized bed reactor 1 and the riser 4. According to one or more embodiments, the angle $\alpha$ formed by the diameter restriction between the dense fluidized bed reactor 1 and the riser 4 is between 90° and 165°, preferably between 90° and 150°. According to one or more embodiments, the riser can also be off-center with respect to the central axis of the dense fluidized bed reactor 1.

According to one or more embodiments, the riser 4 is suitable for being directly fed by and at least partially cracking at least one third feedstock 11, e.g. intermediate cut (of a crude oil) and/or one or more fractions of the products resulting from the FCC corresponding to liquid fractions, corresponding for example to the 20-80° C., 20-220° C. and up to 20-350° C. cut (depending on whether it is desired to maximize the production of olefins or of aromatics).

In the present patent application, the terms "light cut", "lighter/less light cut", "intermediate cut", "heavy cut" and "heavier/less heavy cut" mean a hydrocarbon fraction, the final boiling point of which is higher/less high than that of another hydrocarbon fraction.

In the present patent application, the term "light cut" means a cut, the initial boiling point of which is between 20 and 50° C. and a final boiling point of which is between 70 and 350° C., preferably between 70 and 250° C., very preferably between 70 and 220° C.

In the present patent application, the term "intermediate cut" means a cut, the initial boiling point of which is between 80 and 220° C. and a final boiling point of which is between 160 and 350° C., preferably between 220 and 350° C., such as between 220 and 300° C. or between 300 and 350° C.

In the present patent application, the term "heavy cut" means a cut, the initial boiling point of which is between 80° C. and 350° C. and more generally between 150° C. and 350° C., indeed even between 220 and 350° C., and a final boiling point of which is greater than 300° C., preferably greater than 350° C., such as greater than 500° C. According to one or more embodiments, the heavy cut corresponds to a cut, the final boiling point of which is between 350 and 565° C. (e.g. conventional FCC feedstock, such as a VGO).

According to one or more embodiments, the order of entry of the feedstocks entering the riser 4 directly (i.e. the feedstocks other than the feedstocks (e.g. first feedstock 2) entering the dense fluidized bed reactor 1) is fixed so that a lighter feedstock enters upstream of a heavier feedstock. Thus, not only is the contact time higher for the lighter feedstock in comparison with the contact time of the heavier feedstock but also the catalyst contains less coke and is thus more active in treating a feedstock which is more difficult to crack.

Figure 2:
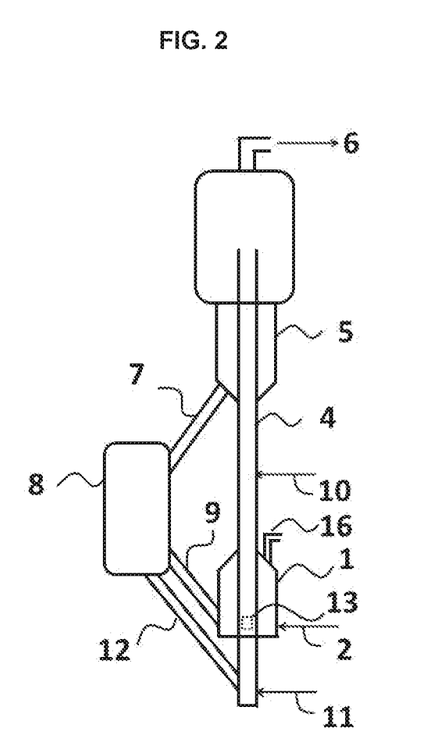
FIG. 2 describes a diagram of an FCC device according to one or more embodiments of the present invention in which the dense fluidized bed reactor is connected to an intermediate feedstock inlet of a riser.

FIG. 2 describes a diagram of an FCC device according to one or more embodiments of the present invention in which:

the regenerator 8 is suitable for sending, via a fifth pipe 12, a second portion of regenerated catalyst to the riser 4 (e.g. catalyst inlet at the riser 4 bottom);

the feed of the third feedstock 11 emerges on the lower feedstock inlet of the riser 4; and the outlet of the dense fluidized bed reactor 1 emerges on an intermediate feedstock inlet of the riser 4 located above the lower feedstock inlet.

With reference to FIG. 2, the third feedstock 11 has the longest contact time in the riser 4 and the second feedstock 10 has the shortest contact time in the riser 4. In addition, if at least a part of the first effluent is sent to the riser 4, said first effluent has an intermediate contact time in the riser 4.

Figure 3A:
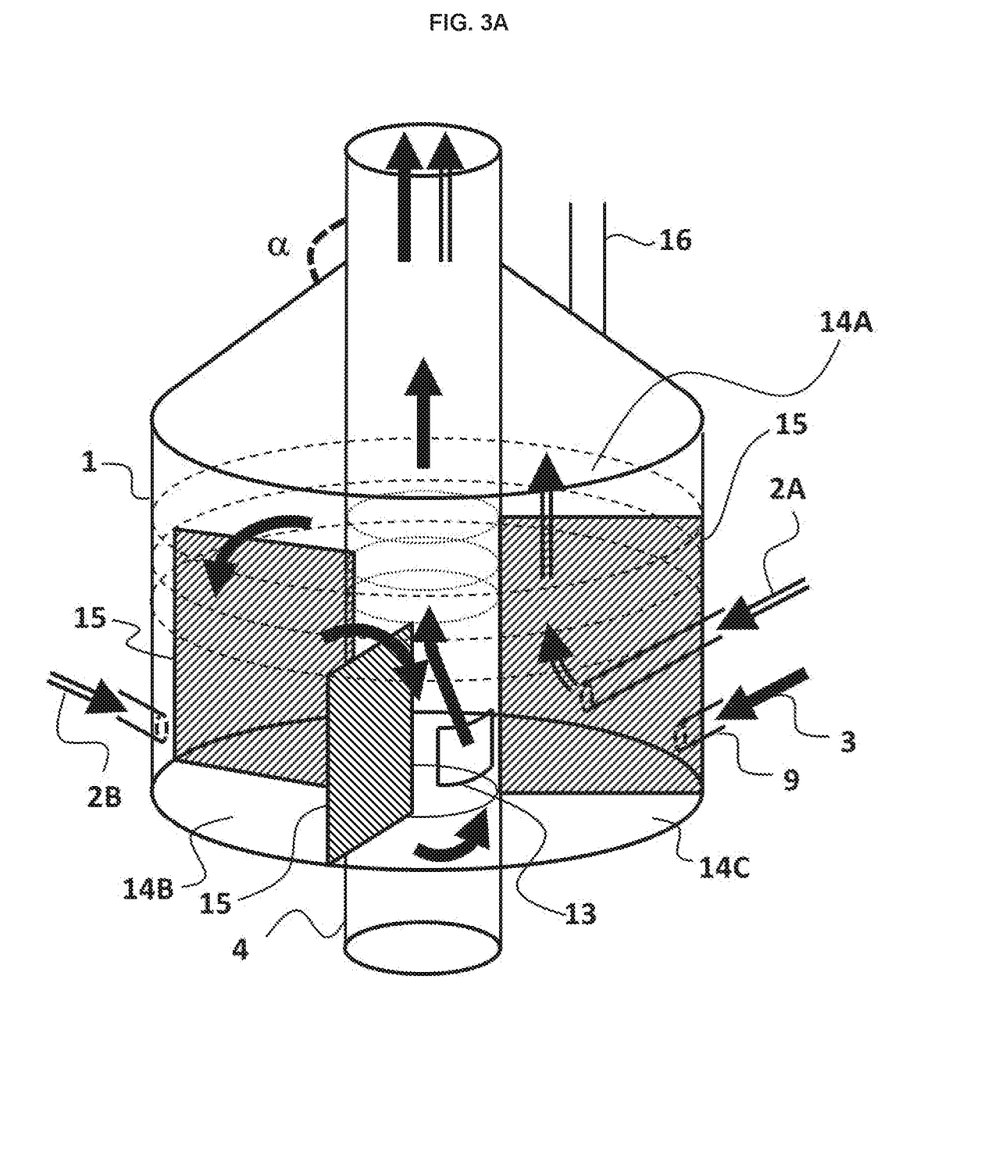
FIG. 3A describes a diagram of an FCC device according to FIG. 2 in which the dense fluidized bed reactor is compartmentalized.
Figure 3B:
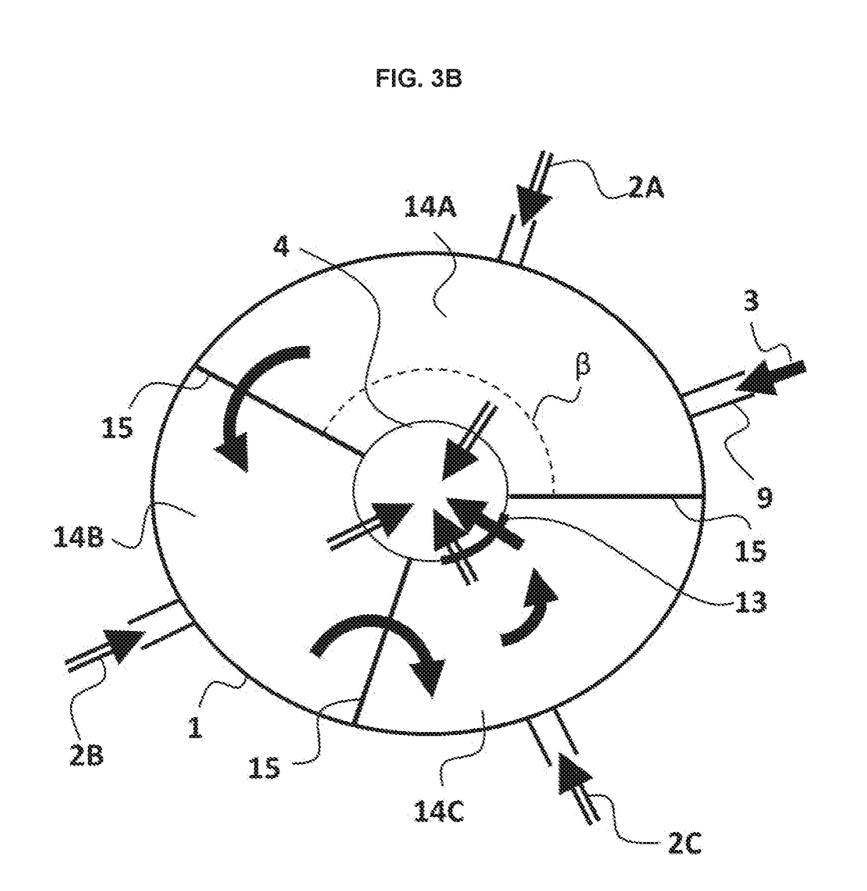
FIG. 3B describes a top view of the FCC device according to FIG. 3A.

With reference to FIG. 3A and to FIG. 3B, according to one or more embodiments, the dense fluidized bed reactor 1 is compartmentalized so that said dense fluidized bed reactor 1 can treat the first feedstock 2 in the form of several light feedstocks 2A, 2B and 2C, each of said light feedstocks entering (e.g. through a dedicated inlet) a dedicated compartment 14A, 14B, 14C. According to one or more embodiments, the number of compartments is between 2 and 10, preferably between 2 and 6. In FIGS. 3A and 3B, the solid arrows represent the path of the catalyst (solid) in the dense fluidized bed reactor 1, and the hatched arrows represent the path of the feedstocks and effluents (gas) in said reactor.

According to one or more embodiments, the lightest feedstock 2A (of the light feedstocks) has the longest contact time in the dense fluidized bed reactor 1 and the least light feedstock 2C (of the light feedstocks) has the shortest contact time in the dense fluidized bed reactor 1. According to one or more embodiments, for example in the case of equivalent flow rates between the lightest feedstock 2A and the other light feedstocks 2B and 2C, the lightest feedstock 2A enters a first compartment 14A; at least one intermediate feedstock 2B enters at least one intermediate compartment (denoted second compartment 14B in FIGS. 3A and 3B); and the least light feedstock 2C enters a last compartment 14C, the first compartment 14A being the biggest compartment (e.g. in volume and/or in height) and the last compartment 14C being the smallest compartment. In the case of different respective flow rates between feedstocks, it is possible to choose the size of the compartments in order to promote a contact time which decreases as the feedstock becomes increasingly heavy.

According to one or more embodiments, the fluidized bed reactor 1 is cylindrical and the compartments 14A, 14B, 14C form radial sectors of said reactor. According to one or more embodiments, the radial sectors are identical and the compartments 14A, 14B, 14C differ in that the first compartment 14A comprises a greater catalyst height than that of the second compartment 14B, and so on, as far as the last compartment 14C comprising the lowest catalyst height. According to one or more embodiments, the radial sectors are different and the angle β of the radial sector of the first compartment 14A is greater than that of the second compartment 14B, and so on, as far as the last compartment 14C, the angle of the radial sector of which is the smallest. According to one or more embodiments, the angle β of the first compartment 14A is at least 20°, preferably at least 30° (e.g. 40°), greater than that of the second compartment 14B, and so on between the second compartment and the third compartment, as far as the last compartment 14C.

With reference to FIG. 3A and to FIG. 3B, the fresh and/or regenerated catalyst 3 enters the first compartment 14A (e.g. via a dedicated inlet 9). According to one or more embodiments, the catalyst from a compartment 14A and 14B other than the last compartment 14C is sent into a downstream compartment (e.g. by overflow above a wall 15 positioned between two adjacent compartments) and the catalyst from the last compartment 14C is sent into the riser 4, for example via a lower window 13 (outlet located at the bottom of the last compartment) or any other means allowing the catalyst to pass from the last compartment to the inside of the riser 4. In this example, the first compartment 14A and the last compartment 14C are separated by a wall 15 suitable for preventing the catalyst 3 from moving directly from the first compartment 14A to the last compartment 14C. According to one or more embodiments, the first effluent (e.g. all the effluents from the compartments 14A, 14B and 14C) is sent to the fractionation column (not represented) via at least one fourth pipe 16.

According to one or more embodiments, at least one intermediate compartment and/or the last compartment are fed with fresh or regenerated catalyst. For example, the dense fluidized bed reactor 1 can be adapted to send additional fresh or regenerated catalyst to the second compartment 14B and/or the last compartment 14C.

Figure 4:
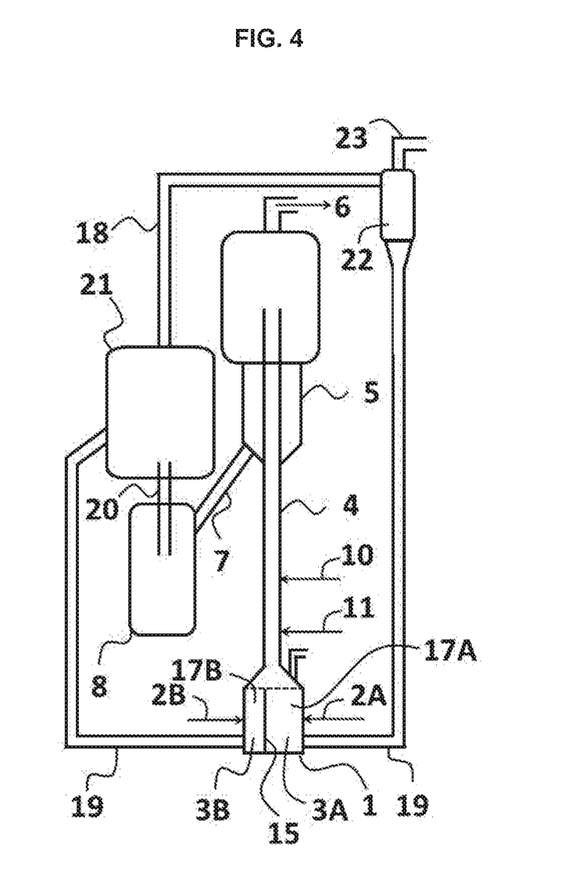
FIG. 4 describes a diagram of an FCC device according to one or more embodiments of the present invention in which the dense fluidized bed reactor is composed of at least two compartments.

FIG. 4 describes a diagram of an FCC device according to one or more embodiments of the present invention in which the dense fluidized bed reactor 1 is composed of at least two compartments 17A and 17B for treating the first feedstock 2 in the form of at least two light feedstocks (2A and 2B), a first compartment 17A fed by a first catalyst 3A, via the sixth pipe 18, and a second compartment 17B fed by a second catalyst 3B (different from the first catalyst), via the seventh pipe 19.

According to one or more embodiments, the compartments 17A and 17B are of identical or different sizes. According to one or more embodiments, for example in the case of equivalent flow rates of the feedstocks of the dense fluidized bed reactor 1, the lightest feedstock 2A (of the light feedstocks) is introduced into the biggest compartment 17A and the least light feedstock 2B (of the light feedstocks) is introduced into the smallest compartment 17B—thus, the contact time of the lightest feedstock 2A is greater than the contact time of the least light feedstock 2B. In the case of different respective flow rates between feedstocks, it is possible to adjust the size of the compartments 17A and 17B in order to promote a contact time which decreases as the feedstock becomes increasingly heavy. According to one or more embodiments, the number of compartments is between 2 and 10, preferably between 2 and 6.

According to one or more embodiments, the first catalyst 3A is less dense (i.e. lighter) and/or less large in particle size (i.e. smaller) than the second catalyst 3B. According to one or more embodiments, the lightest feedstock 2A (of the light feedstocks) is introduced into the compartment 17A comprising the first catalyst 3A and the least light feedstock 2B (of the light feedstocks) is introduced into the compartment 17B comprising the second catalyst 3B.

With reference to FIG. 4, the dense fluidized bed reactor 1 can emerge, for example via the diameter restriction, in the riser 4. In this example, the riser 4 is also suitable for being fed with at least one second feedstock 10 (heavier than the light feedstocks 2A and 2B). At least a part of the first catalyst 3A and of the second catalyst 3B is transported into the riser 4 and then into the stripper 5, where the hydrocarbons adsorbed on the catalysts or entrained with the catalyst are stripped (e.g. the hydrocarbons desorbed or expelled from the interstitial space). The desorbed catalysts enter the regenerator 8 by gravity, where the coke formed on the different catalysts is incinerated. The two regenerated catalysts are transported, via an eighth pipe 20 (also called "lift"; upward gas-solid cocurrent transportation conditions, without reaction other than that of incineration of the coke), into a solid/solid separator 21, where the second catalyst 3B, which is denser and/or larger in particle size, is separated by elutriation from the first catalyst 3A, which is lighter and finer. The first catalyst 3A and the second catalyst 3B are sent, via the sixth and seventh pipes 18 and 19, to the compartments 17A and 17B of the dense fluidized bed reactor 1, respectively.

According to one or more embodiments, the device additionally comprises a gas/solid separation system 22 (e.g. cyclone) for separating gases 23 resulting from the solid/solid separator 21 from the second catalyst 3B.

According to one or more embodiments, the transport fluidized bed reactor is a downward gas-solid cocurrentwise fluidized bed reactor (downer) exhibiting the advantage of preventing the gases, cracked a $1^{st}$ time, from being cracked a $2^{nd}$ time, and making it possible to be more selective toward advantageous products and to form a lesser amount of dry gas. For example, the incorporation of a downward gas-solid cocurrentwise fluidized bed reactor can be achieved by modifying the dense fluidized bed reactor 1 as represented in FIGS. 3A and 3B so that it is suitable for (directly) connecting a downer in place of the riser 4.

Figure 5:
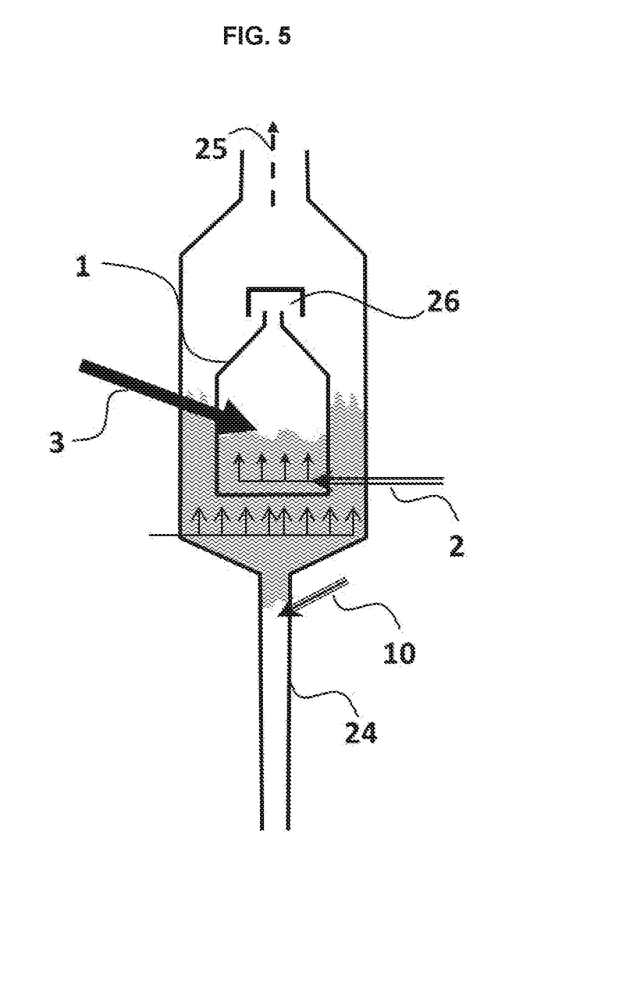
FIG. 5 describes a diagram of an FCC device according to one or more embodiments of the present invention in which the transport fluidized bed reactor is a downward gas-solid cocurrentwise fluidized bed reactor.

According to one or more embodiments, with reference to FIG. 5, the device comprises:
the dense fluidized bed reactor 1 suitable for cracking the first feedstock 2 in the presence of the catalyst 3 and for producing the first effluent 25, which is distributed via an upper opening 26 of the dense fluidized bed reactor 1 (e.g. opening surmounted by a jet breaker), for example to the fractionation column (not represented); and
a downer 24 suitable for cracking the second feedstock 10 in the presence of the catalyst 3 (e.g. partially spent) and for producing the second effluent.

According to one or more embodiments, the catalyst 3 is sent into the downer 24 by overflow, for example via the upper opening 26 of the dense fluidized bed reactor 1.

According to one or more embodiments, the dense fluidized bed reactor 1 is fluidized by a fluidization gas distributor common to all of the compartments (not represented), for example a single ring which serves each compartment, or by a fluidization member individual to each compartment (not represented), it being possible for the latter to be commonly a ring or a sparger. Sparger refers to any system for the distribution of the fluidization gas which exists in the form of branchings. These ring or sparger fluidization members are well known to a person skilled in the art and will not be described further. According to one or more embodiments, the fluidization gas is a mixture comprising the vaporized feedstock.

According to one or more embodiments, the operating conditions of the dense fluidized bed reactor 1 are as follows:
superficial gas velocity: between 0.2 and 2 m/s;
temperature: between 500 and 800° C. and preferably less than 750° C.;
pressure: between 0.1 and 0.6 MPaa; and
contact time of greater than 1 second.

According to one or more embodiments, the dense fluidized bed reactor 1 is suitable for sending, into the stripper 5, a solid flow of between 10 and 200 kg/m²/s. According to one or more embodiments, the dense fluidized bed reactor 1 is suitable for sending, into the stripper 5, a solid flow of between 30 and 150 kg/m²/s.

According to one or more embodiments, the operating conditions of the riser 4 are as follows:
superficial gas velocity: between 3 and 30 m/s;
temperature: between 500 and 700° C. and preferably less than 650° C.;
pressure: between 0.1 and 0.6 MPaa;
contact time of less than 1 second; and
a ratio by weight of the catalyst to the feedstock C/O: between 3 and 50.

According to one or more embodiments, the operating conditions of the downward gas-solid cocurrentwise fluidized bed reactor are as follows:
superficial gas velocity: between 1 and 30 m/s;
temperature: between 500 and 800° C. and preferably less than 750° C.;
pressure: between 0.1 and 0.6 MPaa;
contact time of less than 1 second; and
a ratio by weight of the catalyst to the feedstock C/O: between 5 and 50.

According to one or more embodiments, the "light cut" is a mixture of the light cut resulting from crude oil (e.g. after a first fractionation) and of a part (or all) of the gasoline cut resulting from the fractionation column.

According to one or more embodiments, the "intermediate cut" is a mixture of the intermediate cut resulting from crude oil (e.g. after a first fractionation) and of a part (or all) of the gasoline cut resulting from the fractionation column.

According to one or more embodiments, the "heavy cut" is a mixture of the heavy cut resulting from crude oil (e.g. after a first fractionation) and of a part (or all) of the light cycle oil (LCO) cut resulting from the fractionation column.

The catalyst is a solid catalyst (e.g. density, size and shape of the grains chosen for use in a fluidized bed). The densities, sizes and shapes of the catalysts for fluidized beds are known to a person skilled in the art and will not be described further. According to one or more embodiments, the catalyst is a catalyst of FCC type, containing, for example, what is commonly called a matrix made of clay, of silica or of silica/alumina, of binder and of zeolite, for example from 15% to 50% by weight of zeolite with respect to the weight of the catalyst, preferably a zeolite Y and/or a zeolite ZSM-5. According to one or more embodiments, the catalyst comprises a zeolite ZSM-5. According to one or more embodiments, the grain density of the catalyst is between 1000 and 2000 kg/m³. According to one or more embodiments, the grain density of the catalyst is between 1250 and 1750 kg/m³.

In the present patent application, the term "to comprise" is synonymous with (means the same thing as) "to include" and "to contain", and is inclusive or open and does not exclude other elements not stated. It is understood that the term "to comprise" includes the exclusive and closed term "to consist of". In addition, in the present description, the terms "approximately", "substantially", "more or less", "essentially", "solely" and "about" are synonymous with (mean the same thing as) margin lower and/or greater by 10%, preferably by 5%, very preferably by 1%, of the given value. For example, an effluent comprising essentially or solely compounds A corresponds to an effluent comprising at least 90%, preferably at least 95%, very preferably at least 99%, of compounds A.

EXAMPLES

Example 1: Conversion of a Light Feedstock as a Function of the Contact Time

The conversion of a gasoline feedstock resulting from direct distillation (naphtha straight run) was carried out for different contact times in a dense fluidized bed (FB) reactor composed of 40 g of catalyst, and also in a riser in which the contact time is markedly shorter.

The properties of the feedstock are given in the following table 1.

TABLE 1

| | |
|---|---|
| Density at 15° C. | 0.6905 |
| Paraffins (% by weight) | 33.7 |
| Isoparaffins (% by weight) | 41.3 |
| Olefins (% by weight) | 0 |
| Naphthenes (% by weight) | 19.2 |
| Aromatics (% by weight) | 4.1 |
| 5% Boiling point (° C.) | 52.2 |
| 50% Boiling point (° C.) | 69.7 |
| 95% Boiling point (° C.) | 100.2 |

The PIONA (characterization of compounds of n-Paraffin, Isoparaff in, Olefin, Naphthene, and Aromatic type) of the feedstock is presented in the following table 2.

TABLE 2

| | P | IP | O | N | A |
|---|---|---|---|---|---|
| $C_5$ | 2.31 | 0.39 | 0.00 | 0.00 | 0.00 |
| $C_6$ | 23.24 | 21.20 | 0.00 | 10.74 | 2.54 |
| $C_7$ | 8.12 | 19.19 | 0.00 | 7.80 | 1.54 |
| $C_8$ | 0.00 | 0.46 | 0.00 | 0.61 | 0.01 |
| $C_9$ | 0.00 | 0.02 | 0.00 | 0.03 | 0.00 |
| Total | 33.67 | 41.26 | 0.00 | 19.18 | 4.09 |

The catalyst comprises a commercial additive having 40% of ZSM-5.

The reaction temperature is suitable for having a conversion identical to that which would be present in a riser at 540° C.

The conversion (as % by weight of feedstock) as a function of the contact time, obtained in a riser (for the lowest contact time) and in a dense fluidized bed (FB), is shown in table 3 below.

TABLE 3

| Contact time (ms) | 150 | 570 | 1070 | 2075 | 4080 |
|---|---|---|---|---|---|
| Technology | Riser | FB | FB | FB | FB |
| Conversion (% by weight of feedstock) | 33 | 39 | 44 | 52 | 59 |

The conversion of the feedstock increases significantly with the contact time. For a low contact time, corresponding to that in a riser (contact time in this instance of 150 ms), the conversion is barely half that obtained in a dense fluidized bed (contact time of 4 s). This clearly shows that, in order to achieve a better conversion of a light feedstock, the use of a dense fluidized bed reactor is preferable.

Example 2: Yield of Light Olefins as a Function of the Contact Time

For the same feedstock as that presented in the preceding example, the structure of yield of light olefins as a function of the contact time, obtained in a riser (for the lowest contact time) and in a dense fluidized bed (FB), is shown in the following table 4.

TABLE 4

| Contact time (ms) | 150 | 570 | 1070 | 2075 | 4080 |
|---|---|---|---|---|---|
| Technology | Riser | FB | FB | FB | FB |
| $C_2$ olefins (ethylene)* | 7.3 | 8.6 | 10.9 | 15.5 | 20.3 |
| $C_3$ olefins (propylene)* | 14.1 | 16.7 | 18.7 | 19.3 | 17.6 |
| $C_4$ olefins (butenes)* | 6.2 | 6 | 6.2 | 6.2 | 5.5 |
| Total olefins* | 27.6 | 31.3 | 35.8 | 41 | 43.4 |
| Gain* | 0 | 13% | 30% | 49% | 57% |

*% by weight with respect to the feedstock

The contact time can be adjusted according to the product target. In this example, a contact time close to 2075 ms makes it possible to obtain mainly propylene but it is can be advantageous to continue to increase it, for example to 4080 ms, with the emphasis on maximizing the olefins.

Example 3: Optimum Contact Time According to the Feedstocks

It is shown, in the following table 5, that, for two different feedstocks, the contact time fixed in order to obtain similar yields of light olefins is higher for the lightest feedstock (1454 ms for the feedstock with a density of 0.6905; 2652 ms for the feedstock with a density of 0.67305).

TABLE 5

| Feedstocks | | |
|---|---|---|
| Density 15° C. | 0.6905 | 0.67305 |
| 5% Boiling point (° C.) | 55.2 | 35 |
| 95% Boiling point (° C.) | 100.2 | 60 |
| Operating conditions | | |
| Temperature (° C.) | 680 | 680 |
| Contact time (ms) | 1454 | 2652 |
| Yields | | |
| Dry gas (% by weight/feedstock) | 26.80 | 28.50 |
| $H_2$ (% by weight) | 0.57 | 0.54 |
| $C_1$ (% by weight) | 4.54 | 6.99 |
| $C_2$ (% by weight) | 6.25 | 6.10 |
| $C_2$= (% by weight) | 15.45 | 14.87 |

TABLE 5-continued

| | | |
|---|---|---|
| LPG (% by weight) | 33.75 | 30.49 |
| $C_3$ (% by weight) | 6.42 | 3.57 |
| $C_3=$ (% by weight) | 19.35 | 19.61 |
| Total $C_4$ (% by weight) | 1.59 | 1.02 |
| $iC_4$ (% by weight) | 0.60 | 0.35 |
| $nC_4$ (% by weight) | 0.99 | 0.67 |
| Total $C_4=$ (% by weight) | 6.40 | 6.19 |
| $iC_4=$ (% by weight) | 2.52 | 3.64 |
| $nC_4=$ (% by weight) | 3.88 | 2.55 |
| $C_4==$ (% by weight) | 0.00 | 0.10 |

Example 4

On considering a partitioned reactor with the dimensions shown in the following table 6, a solid flow of 80 kg/m²/s in the stripper, a catalyst grain density of 1500 kg/m³ and a gas velocity in each compartment of 0.8 m/s, the contact times obtained are as follows:

Contact time in compartment No. 1: 3.0 seconds
Contact time in compartment No. 2: 2.6 seconds

TABLE 6

| | |
|---|---|
| Diameter of the reactor (m) | 6 |
| Diameter of the central stripper (m) | 1 |
| Height of the catalyst bed in compartment No. 1 (m) | 8 |
| Height of the catalyst bed in compartment No. 2 (m) | 7 |
| Height of the catalyst bed in compartment No. 3 (m) | 6 |
| Angle of the radial sector of compartment No. 1 (°) | 160 |
| Angle of the radial sector of compartment No. 2 (°) | 120 |
| Angle of the radial sector of compartment No. 3 (°) | 80 |

The invention claimed is:

1. A device capable of fluidized bed catalytic cracking of a hydrocarbon feedstock, said device comprising: a dense fluidized bed reactor (1) suitable for at least partially cracking a first hydrocarbon feedstock (2) in the presence of a catalyst (3) to produce a first effluent, reactor (1) being adapted to operate with a gas velocity between minimum fluidization velocity and transportation velocity, reactor (1) and at least partially feeding with catalyst (3) a transport fluidized bed reactor (4); and the transport fluidized bed reactor (4) suitable for at least partially cracking at least one second hydrocarbon feedstock (10) in the presence of the catalyst (3) to produce a second effluent, reactor (4) being adapted to operate with a gas velocity greater than the transportation velocity, the second hydrocarbon feedstock (10) being a heavier feedstock than the first hydrocarbon feedstock (2).

2. The device as claimed in claim 1, wherein the dense fluidized bed reactor (1) is directly connected to the transport fluidized bed reactor (4) in order to directly feed the transport fluidized bed reactor (4) with catalyst (3).

3. The device as claimed in claim 1, wherein the dense fluidized bed reactor (1) is an ebullating or turbulent fluidized bed reactor.

4. The device as claimed in claim 1, wherein the transport fluidized bed reactor (4) is an upward or downward gas-solid cocurrentwise fluidized bed reactor.

5. The device as claimed in claim 1, wherein the transport fluidized bed reactor (4) is an upward gas-solid cocurrentwise fluidized bed reactor.

6. The device as claimed in claim 1, wherein the dense fluidized bed reactor (1) is connected to an intermediate feedstock inlet of the transport fluidized bed reactor (4).

7. The device as claimed in claim 1, wherein the dense fluidized bed reactor (1) comprises at least two compartments (14A, 14B; 17A, 17B) for treating the first hydrocarbon feedstock (2) in the form of at least one first lighter feedstock (2A) and one first less light feedstock (2B), and in which: either a first compartment (17A) is fed with a first catalyst (3A) and a second compartment (17B) fed with a second catalyst (3B); or a first compartment (14A) is fed with the catalyst resulting directly from a regenerator and a second compartment (14B) is fed with catalyst by movement between the first compartment (14A) and the second compartment (14B).

8. A process for the fluidized bed catalytic cracking of a hydrocarbon feedstock, comprising:

at least partially cracking a first hydrocarbon feedstock (2) in a dense fluidized bed reactor (1) in the presence of a catalyst (3) to produce a first effluent;

feeding with catalyst (3) a transport fluidized bed reactor (4) at least partially from the dense fluidized bed reactor (1); and at least partially cracking at least one second hydrocarbon feedstock (10) in the transport fluidized bed reactor (4) in the presence of the catalyst (3) to produce a second effluent;

the second hydrocarbon feedstock (10) being a heavier feedstock than the first hydrocarbon feedstock (2), said reactor (1) being adapted to operate with a gas velocity between minimum fluidization velocity and transportation velocity, reactor (1) and at least partially feeding with catalyst (3) a transport fluidized bed reactor (4); and the transport fluidized bed reactor (4) being adapted to operate with a gas velocity greater than the transportation velocity, the second hydrocarbon feedstock (10) being a heavier feedstock than the first hydrocarbon feedstock (2).

9. The process as claimed in claim 8, in which the dense fluidized bed reactor (1) is directly connected to the transport fluidized bed reactor (4) in order to directly feed the transport fluidized bed reactor (4) with catalyst (3).

10. The process as claimed in claim 8, in which the effluent from the dense fluidized bed reactor (1) is an ebullating or turbulent fluidized bed reactor.

11. The process as claimed in claim 8, in which the transport fluidized bed reactor (4) is an upward or downward gas-solid cocurrentwise fluidized bed reactor.

12. The process as claimed in claim 8, in which the transport fluidized bed reactor (4) is an upward gas-solid cocurrentwise fluidized bed reactor.

13. The process as claimed in claim 8, in which the dense fluidized bed reactor (1) is connected to an intermediate feedstock inlet of the transport fluidized bed reactor (4).

14. The process as claimed in claim 8, in which the dense fluidized bed reactor (1) comprises at least two compartments (14A, 14B; 17A, 17B) for treating the first hydrocarbon feedstock (2) in the form of at least one first lighter feedstock (2A) and one first less light feedstock (2B), and in which: either a first compartment (17A) is fed with a first catalyst (3A) and a second compartment (17B) fed with a second catalyst (3B); or a first compartment (14A) is fed with the catalyst resulting directly from a regenerator and a second compartment (14B) is fed with catalyst by movement between the first compartment (14A) and the second compartment (14B).

15. The process as claimed in claim 8, in which the operating conditions of the dense fluidized bed reactor (1) are as follows:

superficial gas velocity: between 0.2 and 2 m/s;

temperature: between 500 and 800° C. and preferably less than 750° C.;
pressure: between 0.1 and 0.6 MPaa; and
contact time of greater than 1 second, and/or
the operating conditions of the transport fluidized bed reactor (4) are as follows:
superficial gas velocity: between 3 and 30 m/s;
temperature: between 500 and 700° C. and preferably less than 650° C.;
pressure: between 0.1 and 0.6 MPaa;
contact time of less than 1 second; and
C/O: between 3 and 50.

* * * * *